(12) United States Patent
Cook

(10) Patent No.: US 6,767,103 B2
(45) Date of Patent: Jul. 27, 2004

(54) COMPACT FOUR-MIRROR ANASTIGMAT TELESCOPE

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/104,423

(22) Filed: Mar. 22, 2002

(65) Prior Publication Data

US 2003/0179443 A1 Sep. 25, 2003

(51) Int. Cl.[7] .................................................. G02B 5/10
(52) U.S. Cl. ........................ 359/859; 359/861; 359/729; 359/728
(58) Field of Search .................................. 359/365, 366, 359/728, 399, 727, 729, 730, 731, 857, 858, 859, 860, 861

(56) References Cited

U.S. PATENT DOCUMENTS

| | | | |
|---|---|---|---|
| 4,265,510 A | 5/1981 | Cook | 359/366 |
| 4,804,258 A | 2/1989 | Kebo | 359/366 |
| 5,144,476 A * | 9/1992 | Kebo | 359/366 |
| 5,309,276 A | 5/1994 | Rogers | 359/366 |
| 5,477,395 A * | 12/1995 | Cook | 359/861 |
| 5,550,672 A * | 8/1996 | Cook | 359/365 |
| 5,640,283 A * | 6/1997 | Warren | 359/859 |
| 5,805,365 A | 9/1998 | Sweatt | 359/858 |
| 6,302,548 B2 | 10/2001 | Suenaga et al. | 359/858 |

FOREIGN PATENT DOCUMENTS

| | | |
|---|---|---|
| DE | 101 57 045 | 9/2002 |
| EP | 0 689 075 | 12/1995 |
| EP | 1 081 526 | 3/2001 |

* cited by examiner

*Primary Examiner*—Thong Nguyen
*Assistant Examiner*—Arnel C. Lavarias
(74) *Attorney, Agent, or Firm*—John E. Gunther; Leonard A. Alkov; William C. Schubert

(57) ABSTRACT

An optical system comprises a three-mirror anastigmat including a primary mirror, a secondary mirror, and a tertiary mirror positioned to reflect a beam path. An intermediate image is formed on the beam path at an intermediate-image location between the secondary mirror and the tertiary mirror. A negative-optical-power field mirror is positioned in the beam path at a field-mirror location subsequent to the intermediate-image location along the beam path. The field mirror reflects the intermediate image to the tertiary mirror.

4 Claims, 3 Drawing Sheets

COMPACT FOUR-MIRROR ANASTIGMAT TELESCOPE

This invention was made with Government support under Contract No. F04701-99-C-0047 (Subcontract No. 61772CD29S TRW Space & Defense) awarded by the Department of the Air Force. The Government has certain rights in this invention.

This invention relates to an all-reflective, relayed optical system and, more particularly, to a modified anastigmat in which the addition of a negative-optical-power field mirror produces a very compact telescope.

BACKGROUND OF THE INVENTION

A basic three-mirror anastigmat optical system uses a positive-optical-power primary mirror, a negative-optical-power secondary mirror, and a positive-optical power tertiary mirror arranged along a beam path. The primary mirror and the secondary mirror form an intermediate image that is relayed to a final image plane by the tertiary mirror. The structure and function of the three-mirror anastigmat optical system are discussed more fully in U.S. Pat. No. 4,265,510, whose disclosure is incorporated by reference.

It is desirable for some applications that the telescope be compact, with a ratio of the physical length to the effective focal length (PL:EFL) of the telescope that is small. A compact telescope occupies a relatively small package, with the associated small size and light weight. The small size and light weight are desirable for telescopes that are to be launched into space, to meet booster envelope and weight limitations. The conventional three-mirror anastigmat works well for many such applications requiring a compact telescope. For example, for a fast, short-focal-length optical system with an optical speed in the range of F/2.5–F/3, the PL:EFL ratio may be made to be about 0.5, judged sufficiently compact for this fast optical speed However, for other applications, the three-mirror anastigmat cannot readily be built in a sufficiently compact arrangement without highly undesirable optical and manufacturing consequences. For example, when the optical speed is in the F/5 to F/6 range, for some applications it is desirable that the PL:EFL ratio be less than about 0.25–0.30, which cannot readily be achieved with the three-mirror anastigmat.

There is a need for a design of an all-reflective, relayed optical-system with the telescope characteristics of the three-mirror anastigmat but with a substantially smaller ratio of PL:EFL than possible with the known three-mirror anastigmat. The present invention fulfills this need, and further provides related advantages.

SUMMARY OF THE INVENTION

The present invention provides an optical system in the form of a compact four-mirror anastigmat telescope. The optical system is all-reflective, flat field, relayed, and with an unobscured aperture. It has a small ratio of physical length to effective focal length in the medium optical speed range, producing a relatively short, relatively light weight telescope. The optical system of the invention maintains good optical performance in respect to low aberrations, low distortion, reasonable pupil aberrations, and good focal plane incidence angles, as found in conventional three-mirror anastigmatic optical systems.

In accordance with the invention, an optical system comprises a three-mirror anastigmat including a primary mirror, a secondary mirror, and a tertiary mirror positioned to reflect a beam path. An intermediate image is formed on the beam path at an intermediate-image location between the secondary mirror and the tertiary mirror. A negative-optical-power field mirror is positioned in the beam path at a field-mirror location subsequent to the intermediate-image location along the beam path. The field mirror reflects the intermediate image to the tertiary mirror.

In the preferred design, the primary mirror and the tertiary mirror each have positive optical power, and the secondary mirror has negative optical power. The field mirror has negative optical power, preferably such that a ratio of a field mirror focal length to a secondary mirror focal length is between about 1.25 and about 1.75. To obtain a flat field, the sum of the optical powers of the primary mirror, the secondary mirror, the field mirror, and the tertiary mirror is preferably substantially zero. In one example, the primary mirror is a primary-mirror ellipsoid, the secondary mirror is a secondary-mirror hyperboloid, the tertiary mirror is a tertiary-mirror ellipsoid, and the field mirror is a field-mirror sphere.

In one embodiment, the optical speed of the optical system is from about F/5 to about F/6. A ratio of physical length to effective focal length of the optical system is less than about 0.25.

Stated in other terms, an optical system comprises a positive-power primary mirror, a negative-power secondary mirror, a negative-power field mirror, and a positive-power tertiary mirror. The mirrors are arranged such that a beam path is reflected from the primary mirror to the secondary mirror to the field mirror to the tertiary mirror, and an intermediate image is formed in the beam path after reflection from the secondary mirror but before reflection from the field mirror. The intermediate image is reflected by the field mirror to the tertiary mirror and thence to an image location. Other features discussed herein may be used with this embodiment.

In another embodiment, an optical system comprises a set of four powered mirrors whose powers sum to substantially zero and which are arranged such that a beam path is reflected from a primary mirror to a secondary mirror to a field mirror to a tertiary mirror to an image plane. An intermediate image is formed in the beam path after reflection from the secondary mirror. The intermediate image is reflected by the field mirror to the tertiary mirror and thence to the image plane. An optical speed of the optical system is from about F/5 to about F/6, and a ratio of physical length to effective focal length of the optical system is less than about 0.25. Other features discussed herein may be used with this embodiment.

The present approach utilizes the features of the three-mirror anastigmat, and then adds the field mirror to reduce the physical length of the optical system relative to the effective focal length. The optical system is thereby reduced in size and weight, important advantages in applications such as space-based optical systems. The quality of the image is retained to a high degree. The optical system is an all-reflective type, which avoids chromatic aberrations introduced when lenses are used. The present all-reflective approach is therefore more suitable for imaging a light beam with a wide range of wavelengths, as compared with a refractive optical system.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
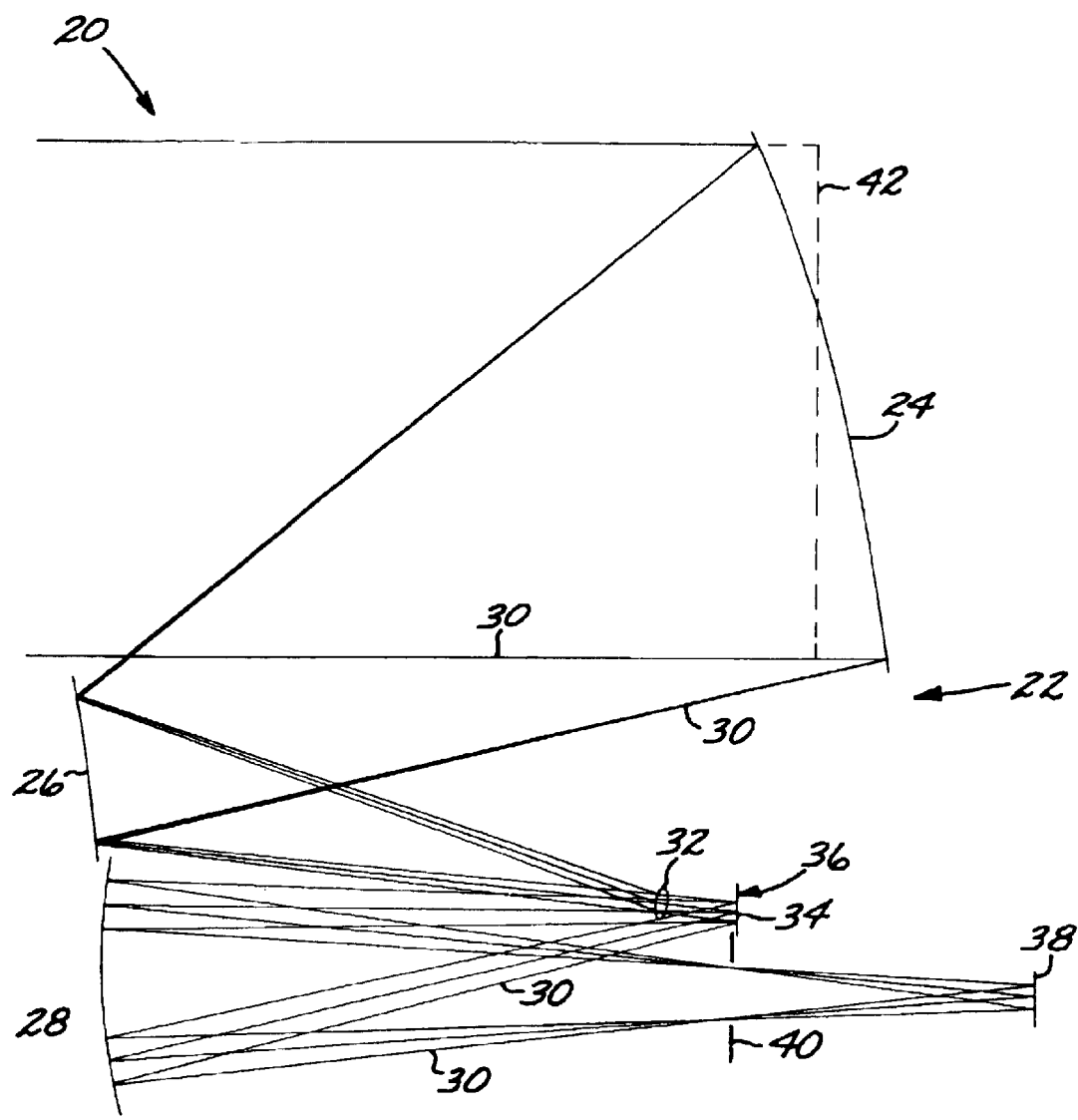
FIG. 1 is an elevational-view schematic ray path drawing of an optical system according to the invention.
Figure 2:
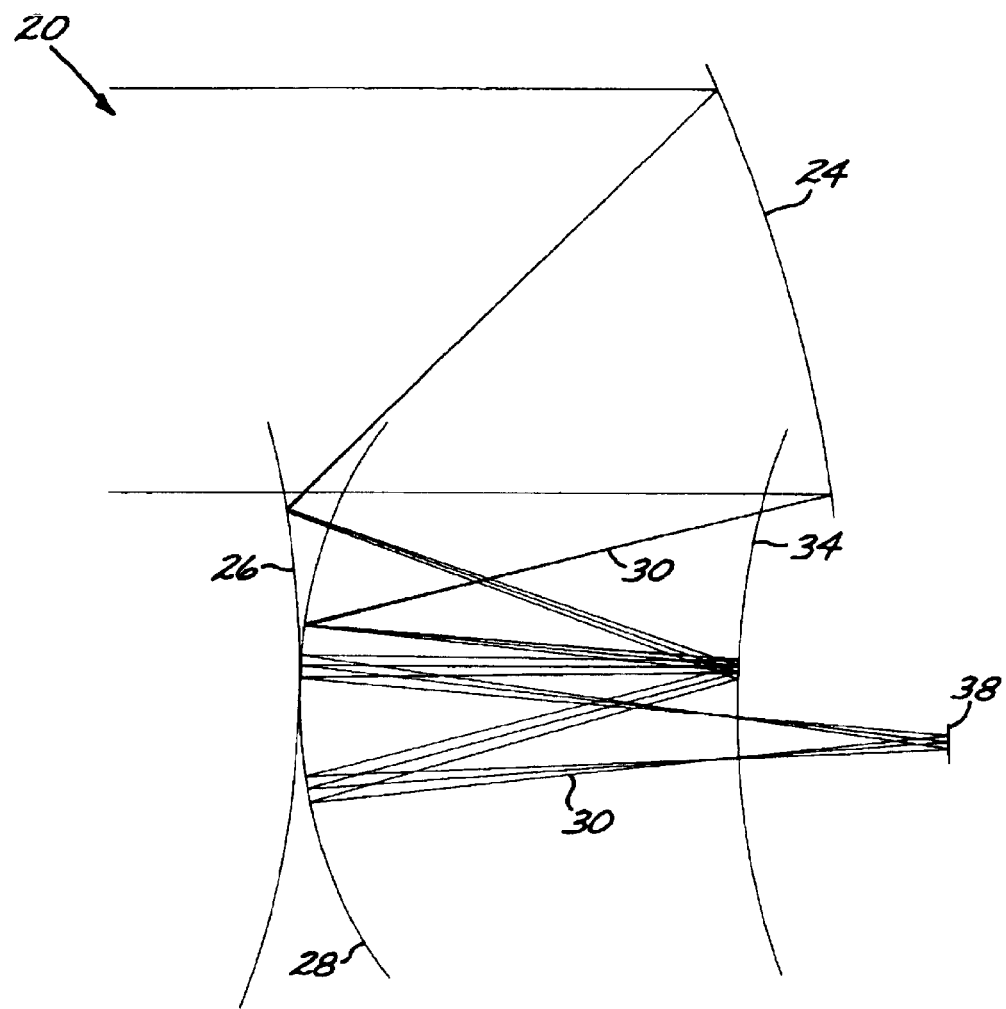
FIG. 2 is a plan-view schematic ray path drawing of the optical system of FIG. 1.

FIGS. 1 and 2 are ray path drawings of an all-reflective optical system 20. The optical system comprises a three-mirror anastigmat 22 including a primary mirror 24, a secondary mirror 26, and a tertiary mirror 28 positioned to reflect a beam path 30. An intermediate image 32 is formed on the beam path 30 at an intermediate-image location between the secondary mirror 26 and the tertiary mirror 28.

A negative-optical-power field mirror 34 is positioned in the beam path 30 at a field-mirror location 36 subsequent to the location of the intermediate-image 32 along the beam path 30 but before the beam path reaches the tertiary mirror 28. The field mirror 34 reflects the intermediate image to the tertiary mirror 28, which in turn reflects the beam path 30 to an image plane 38. An aperture stop 40 may be provided between the tertiary mirror 28 and the image plane 38. This aperture stop 40 is positioned at the location of an optical image of the system entrance pupil 42. FIG. 1 depicts the optical system 20 with the aperture stop 40, and FIG. 2 depicts the optical system 20 without the aperture stop.

In the optical system 20, the primary mirror 24 and the tertiary mirror 28 each have a positive optical power. The secondary mirror 26 and the field mirror 34 each have a negative optical power. In general, the positive optical power of the primary mirror 24 is different from the positive optical power of the tertiary mirror 28, and the negative optical power of the secondary mirror 26 is different from the negative optical power of the field mirror 34. Preferably, the field mirror 34 has a field-mirror focal length such that a ratio of the field mirror focal length to a secondary mirror focal length is between about 1.25 and about 1.75. Preferably and in the optical system 20, the sum of the optical powers of the primary mirror 24, the secondary mirror 26, the field mirror 34, and the tertiary mirror 28 is substantially zero, so that the image formed at the image plane 38 is in fact planar. In another embodiment that is less preferred, the optical powers of the mirrors 24, 26, 34, and 28 do not sum to substantially zero, and the image at the image plane 38 is non-planar.

In the preferred embodiment, the primary mirror 24 is a primary-mirror ellipsoid, the secondary mirror 26 is a secondary-mirror hyperboloid, the tertiary mirror 28 is a tertiary-mirror ellipsoid, and the field mirror 34 is a field-mirror sphere. In general, the optical parameters of the primary-mirror ellipsoid are different from the optical parameters of the tertiary-mirror ellipsoid. (In practice, each mirror is a segment of the indicated form, but following the usual practice the mirror is described simply in terms of that form. For example, the primary mirror 24 is a segment of the primary-mirror ellipsoid, and is generally termed a "primary-mirror ellipsoid".)

This arrangement of mirrors leads to a ratio of physical length to effective focal length of the optical system of less than about 0.25, in the optical system 20 wherein the optical speed of the optical system is from about F/5 to about F/6. This optical system is thus extraordinarily compact.

An exemplary optical prescription for the optical system 20 according to the invention is set forth in Table 1. This prescription is normalized to a system focal length of 1.000. In these terms, the entrance pupil diameter is 0.200, the system speed is F/5.0, the field offset is −1.16278 degrees, the aperture stop 40 diameter is 0.0195, and the field of view is 0.40×0.40 degrees.

TABLE 1

| Identification | Radius | CC | Thickness |
|---|---|---|---|
| Entrance Pupil | NA | NA | 0.035954 |
| Primary Mirror 24 | −0.700189 | −0.937647 | −0.261089 |
| Secondary Mirror 26 | −0.323513 | −5.860907 | 0.197896 |
| Field Mirror 34 | 0.437192 | NA | −0.211391 |
| Tertiary Mirror 28 | 0.259227 | −0.113297 | 0.209144 |
| Aperture Stop 40 | NA | NA | 0.096840 |

NA is not applicable.

Figure 3:
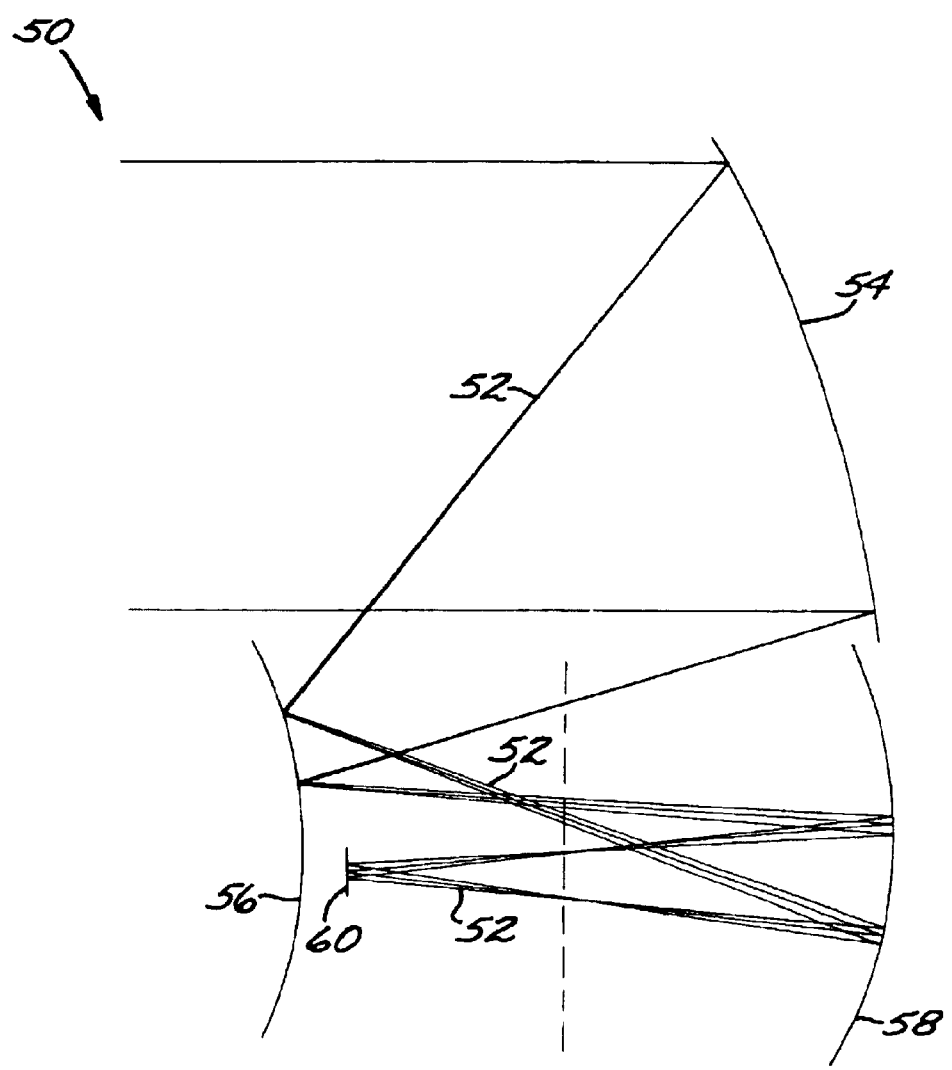
FIG. 3 is a plan-view schematic ray path drawing of a three-mirror anastigmat optical system.

FIG. 3 illustrates a three-mirror anastigmat optical system 50 which is designed in an attempt to achieve the compact mirror arrangement of the four-mirror optical system 20 of FIGS. 1–2. The three-mirror anastigmat optical system 50 has a ray path 52 that reflects in succession from a positive-optical-power first mirror 54, a negative-optical-power second mirror 56, and a positive-optical-power third mirror 58, to an image location 60. A comparison of the optical system 50 of FIG. 3 and the optical system 20 of FIG. 2 of the present approach demonstrates the reasons for the difficulties in achieving a compact optical system with the conventional three-mirror anastigmat 50, and how these difficulties are overcome with the present approach. (In FIGS. 2 and 3, the extent of the reflecting surfaces has been extended beyond that necessary to form the images to allow visual estimate of their respective optical powers.)

In the three-mirror approach of FIG. 3, the optical powers of the individual mirrors 54, 56, and 58 must be increased considerably in an attempt to achieve a small package (that is, a small physical length PL). To make the optical powers greater, the mirror radii must be decreased significantly, so that the mirrors are more sharply curved. Such higher power mirrors are more difficult to manufacture and to align in the tolerances necessary in order to achieve acceptable image quality. In contrast, the mirrors 24, 26, 28, and 34 of the present approach of FIGS. 1–2 have lower optical powers so that the mirror radii are greater, and are therefore easier to manufacture and align. In the present approach, the negative optical power required to achieve a flat-field condition at the image plane 38 is contributed both by the secondary mirror 26 and by the field mirror 34.

In the present approach of FIGS. 1–2, the negative optical power is present in both the objective (mirrors 24 and 26) and relay (mirrors 34 and 28) portions of the optical system 20. (The objective portion forms the intermediate image 32, and the relay portion reimages the intermediate image 32 to the final image plane 38.) In the three-mirror-anastigmat approach of FIG. 3, on the other hand, the negative optical power is present in only the objective (mirrors 54 and 56) portion of the optical system 50, and specifically only in mirror 56, but not in the relay portion (mirror 58). By allocating the negative optical power into both the objective and relay portions of the optical system, the overall optical system may be made more compact, as will be explained next.

The two basic portions of the optical system, the objective portion and the relay portion, may first be considered separately and then in relation to each other. The relay portion has no fundamental "linear" constraints (such as a certain focal length). Instead, it has a fixed ratio of two linear constraints (the object and image distances), which is otherwise known as the relay's magnification, that must be maintained. In order to achieve a compact relay portion, it is necessary for the positive-power mirror (or mirrors) in the relay portion to have small radii (i.e., short focal lengths). The resulting object and image distances are short, and the overall goal of compactness of the relay portion is achieved.

The objective portion, on the other hand, does have a "linear" constraint, which is the objective-portion focal length. In order to achieve a compact objective portion, it is necessary to construct a telephoto arrangement of the two mirrors that comprise the objective portion: the first mirror has more positive power than is needed to achieve the required focal length, and the second mirror has considerable negative optical power such that the combination of the two mirrors (together with the appropriate spacing) will give the required focal length, and have a physical length (precisely that appropriate spacing) that is less than the required objective-portion focal length. If sufficiently small radii are used for both mirrors in the telephoto arrangement, the physical length may be much smaller than the focal length, and the goal of compactness of the objective portion is achieved.

The highly desired flat focal plane condition requires that the sum of all the mirror powers in the optical system must be substantially zero (i.e., substantially zero Petzval sum). If a design were based on a conventional three-mirror anastigmat optical system 50 (as in FIG. 3), which normally has a PL:EFL ratio of 0.5, but were modified to achieve a ratio of 0.25, reducing the radius of the third mirror 58 is the first step. This first step has other important consequences, in that the substantially zero Petzval sum condition is no longer maintained. The power in the second mirror 56, the sole source of negative optical power in achieving the zero Petzval sum in a conventional three-mirror anastigmat optical system 50, must be increased not only to offset the increased positive power of the third mirror 58, but also to offset the increased positive optical power in the first mirror 54 necessary to maintain the focal length of the objective portion and also to achieve an even shorter physical length of the objective portion. The end result is significantly higher optical power in all of the mirrors 54, 56, and 58, with the increased fabrication and alignment difficulties (and potential performance impacts) that follow.

The present invention discussed in relation to FIGS. 1–2 provides for the field mirror 34 to supply additional negative optical power as part of the relay portion. Thus the shorter radius of the positive power tertiary mirror 28 in the relay portion does not have to be compensated by additional negative power in the secondary mirror 26 in the objective portion. There is also no need to further reduce the radius of the positive power primary mirror 24 in order to maintain the objective-portion focal length. Because of the folding nature of the field mirror 34 (turning the light back in the general direction from which it came), the intermediate image 32 formed by the objective portion may be moved closer to the primary mirror 24, and the required telephoto ratio needed in the objective portion may be relaxed over what would conventionally be required to achieve the PL:EFL ratio of 0.25. Thus, the properly positioned field mirror 34 acts to reduce the powers of the various other mirrors 24, 26, and 28 by several means, and thereby relaxes the fabrication and alignment tolerances of the optical system 20.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system comprising:
    a positive-power primary mirror;
    a negative-power secondary mirror;
    a negative-power field mirror, wherein a ratio of a field mirror focal length to a secondary mirror focal length is between about 1.25 and about 1.75; and
    a positive-power tertiary mirror,
  wherein the mirrors are arranged such that a beam path is reflected from the primary mirror to the secondary mirror to the field mirror to the tertiary mirror,
  wherein an intermediate image is formed in the beam path after reflection from the secondary mirror, and
  wherein the intermediate image is reflected by the field mirror to the tertiary mirror.

2. The optical system of claim 1, wherein the sum of the optical powers of the primary mirror, the secondary mirror, the field mirror, and the tertiary mirror is zero.

3. The optical system of claim 2, wherein the primary mirror is a primary-mirror ellipsoid, the secondary mirror is a secondary-mirror hyperboloid, the tertiary mirror is a tertiary-mirror ellipsoid, and the field mirror is a field-mirror sphere.

4. The optical system of claim 1, wherein an optical speed of the optical system is from about F/5 to about F/6.

* * * * *